Feb. 17, 1959 J. L. STUBBLEFIELD 2,873,836
DEVICE FOR DIVIDING A SINGLE LINE OF
CARTONS INTO TWO LINES
Filed April 19, 1956 2 Sheets-Sheet 1

INVENTOR.
JAMES L. STUBBLEFIELD
BY
ATTORNEYS

Feb. 17, 1959

J. L. STUBBLEFIELD 2,873,836

DEVICE FOR DIVIDING A SINGLE LINE OF
CARTONS INTO TWO LINES

Filed April 19, 1956

INVENTOR.
JAMES L. STUBBLEFIELD
BY Fleke and Swain

ATTORNEYS

United States Patent Office 2,873,836
Patented Feb. 17, 1959

2,873,836

DEVICE FOR DIVIDING A SINGLE LINE OF CARTONS INTO TWO LINES

James L. Stubblefield, Denison, Tex.

Application April 19, 1956, Serial No. 579,190

5 Claims. (Cl. 193—36)

This invention relates to a device for dividing a single line of cartons on a conveyor into two lines and particularly to devices of this kind which are adapted to be positioned in a chute or similar carton conveying means to shunt alternate cartons into secondary or further delivery chutes.

As is well known, cartons are frequently delivered from a packaging or storage point, for example, to a freight loading zone, for example, by means of a chute or a so-called skate-wheel conveyor. The cartons can, of course, be slid down the chute or the skate wheel conveyor as rapidly as they can be placed upon it and frequently the cartons will be in actual physical contact with each other all the way from the point where they are put on the conveyor to the point at which they are taken from the conveyor. The rate at which they can be passed down the conveyor or chute therefore depends, in many instances, upon the speed with which they can be removed. The removal is customarily, or at least in most instances, done by hand and the person removing the carton from the conveyor must also position the same at some distance therefrom so the limiting factor upon the capacity of the chute is the speed with which the individual or individuals may remove the cartons therefrom.

I have found that where two individuals, for example, are removing packages from a single chute, they frequently get into each other's way and find the cartons jammed one against the other. Two or more workers are frequently unable to keep up with a steady flow of cartons. Moreover, I have found, for example, that a single conveyor chute may feed enough cartons from a warehouse to a loading area, for example, to permit the loading of two trailers or freight cars. It may thus be desirable to utilize two feed lines from a single conveyor, and my device, when placed in a conveyor or chute, will shunt alternate cartons to predetermined lines. In this way, a single major chute or conveyor may be permanently installed in a warehouse, for example, and secondary feeder lines may be maintained at the end thereof with my automatic carton dividing or separating apparatus.

It is an object of this invention to provide a dividing apparatus of this kind in which alternate cartons are shunted to predetermined secondary chutes or conveyors.

It is a further object of this invention to provide a device of this kind which may, when desired, be locked in predetermined positions whereby it will be inoperative.

It is a further object of this invention to provide a device of this kind which is responsive to the cartons, themselves, and does not require the utilization of any electrical, hydraulic or pneumatic means or human intervention. It is a single, mechanical, fool-proof piece of equipment.

Other objects and advantages of this invention will appear from the following specification taken in conjunction with the accompanying drawings, in which.

Figure 1:
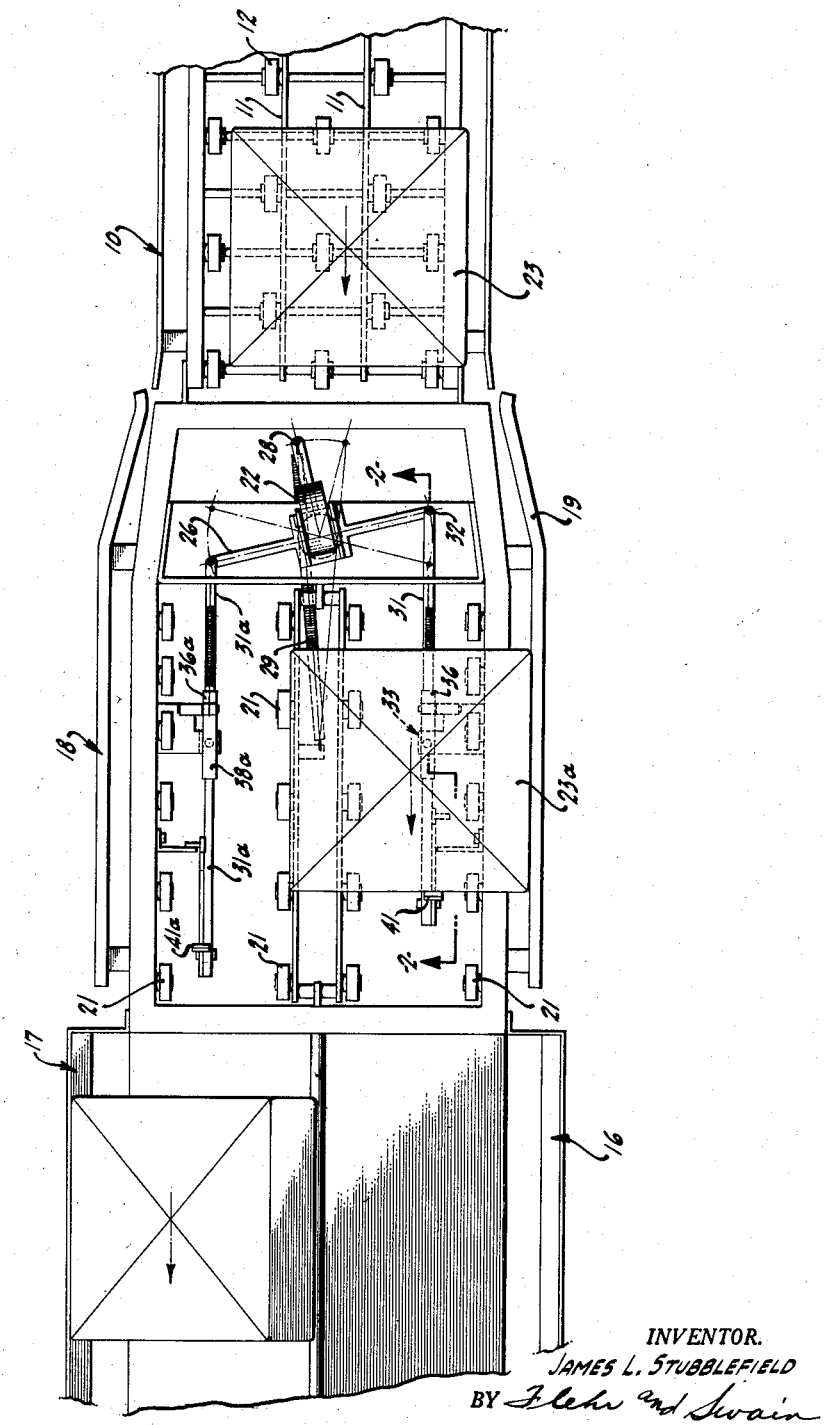
Figure 1 represents a plan view skate wheel conveyor mechanism in which my carton divider has been inserted to shunt alternate cartons from different conveyors.

As shown generally in Figure 1, I have provided a conventional conveyor mechanism 10 provided with a plurality of longitudinal ribs 11 which support a plurality of so-called skate wheels 12 and which is, in all respects, a conventional skate wheel conveyor. This conveyor is, of course, supported up on a suitable framework (not shown) which is likewise conventional in every regard.

I also provide two chutes 16 and 17. As indicated, chutes 16 and 17 are conventional metal chutes set at an incline whereby the cartons slide down the chutes by gravity. It is, of course, possible that the two chutes 16 and 17 can be in the form of skate wheel conveyors. However, it is only important that they be chutes of the type which are adapted to receive cartons and guide the same to their ultimate destination. Between the principal conveyor 10 and the two receiving conveyors 16 and 17, I have inserted my dividing unit 18.

Unit 18 consists of a suitable frame 19 which is provided with a number of skate wheels 21 which are secured to the framework 19 in any suitable manner and which are adapted to support a carton and permit the same to pass over the divider 18. The means for shunting successive cartons from side-to-side consists of a shunting caster 22 which is adapted to be moved between one of two positions, alternately. The caster 22, being set at an angle to the direction of travel of the carton 23, will urge the carton 23 to one side or the other. As viewed in Figure 1, the caster 22 would urge the carton 23 downwardly toward the bottom of the sheet of drawings. When the caster 22, however, is pivoted to its other, or dotted line position, the carton 23 would be directed to the upper side of the unit 18, as viewed in Figure 1, and from the upper side of the member 18 to the chute 17.

The caster 22 is rotatably mounted upon a suitable pair of vertical supports 24 which, in turn, are secured to a cross member 26 which is pivoted to the frame 19 at point 27 by means of a suitable pivotal arrangement. The cross member 26 is provided with a T extension 28 which, as shown, extends generally towards the conveyor 10. To the remote end of the arm 28 there is secured a spring 29 whose other end is fixed to the frame 19. The purpose of the spring 29 is to retain the caster 22 in a predetermined position because, it will be seen, as the caster 22 is moved from one operating position to another operating position, the spring 29 passes over dead center (as determined by the pivot 27) thus providing a snap action to the cross member 26 and the T member 28. The snap action assures rapid re-positioning of the caster 22 from one operating position to another.

Figure 2:
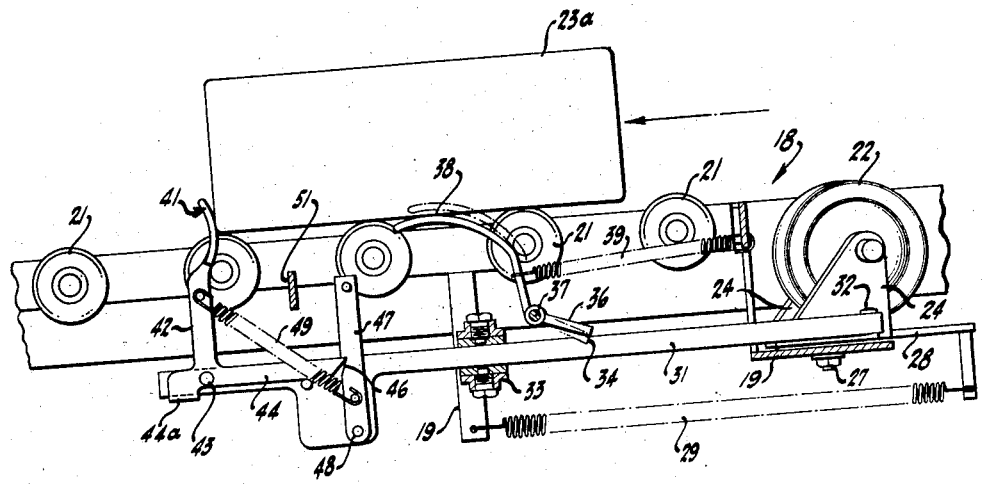
Figure 2 is a view taken along the line 2—2 of Figure 1, showing the means for controlling the shunting wheel before the same is shunted.
Figure 3:
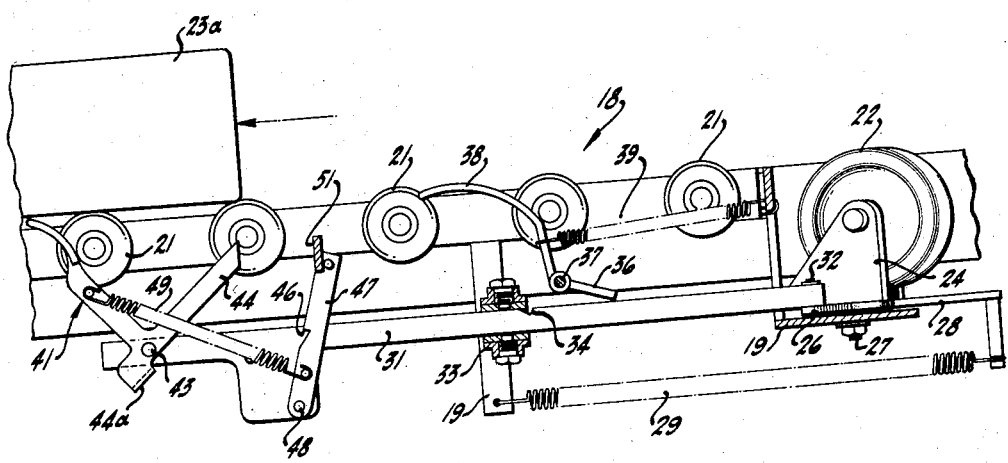
Figure 3 is a vew taken along the line 2—2 of Figure 1, showing the shunting wheel after the same has been actuated to accommodate the following carton.

To the remote ends of the cross arm 26, there are connected substantially identical actuating means illustrated in Figures 2 and 3. The actuating means consists of a shaft 31 which is pivotally connected to the cross member 26 at 32 and which is held in such a position that it may be reciprocated along its longitudinal axis by suitable guide and retaining means 33, which in turn is secured to a portion of the frame 19.

The member 31 is provided with a notch 34, as indicated in Figure 2, which may be engaged by a ratchet member 36 mounted upon and pivoted with respect to the frame 19 at 37. The remote end of the ratchet 36 extending beyond the pivot 37 consists of an arm 38 which is adapted to extend above the plane formed by the top of the skate wheels 21 when the ratchet 36 is in latched position, that is, when it engages the notch 34. Spring 39 which is secured to the arm 38 and to the frame 19, normally urges the arm 38 upwardly and, when the shaft 31 is at locked position, urges the pawl 36 into the notch 34. However, when a carton passes over the skate wheels on that side of my divider 18 towards which it has been shunted by the caster 22 and engages the arm 38, the pawl 36 is disengaged from the notch 34 and the arm 31 is free to be moved longitudinally.

The means for moving the arm 31 longitudinally after the same has been released for longitudinal movement by the removal of the pawl 36 from the notch 34, consists of the L-shaped member 41, one arm 42 of which extends upwardly above the plane formed by the upper surfaces of the skate wheels 21. The member 41 is pivoted to the shaft 31 at 43, and its other arm 44 extends in the same general horizontal plane as the arm 31. That end of the arm 44 remote from the pivot 43 engages a notch 46 in member 47. Member 47 is pivoted to the shaft 31 at 48 and its free end extends substantially above the shaft 31 but not above the plane formed by the skate wheels 21. A spring 49 which is connected to the arms 47 and 42 tends to swing the arm 47 about the pivot 48 in a counterclockwise direction, but this movement is prevented by the engagement of the arm 44 in the notch 46. However, the arm 47 is adapted to engage a portion 51 of the frame 19 when moved to the left, as indicated in Figure 3.

Operation of the device may briefly be described as follows: Let it be assumed that the device is in the normal operating position illustrated in Figure 1 with the caster wheel 22 in the position illustrated in Figure 1 and a carton 23 is advancing down the conveyor 10. The caster 22, as has previously been pointed out, is mounted upon a cross arm 26 and will be in the position illustrated generally in Figure 2. The shaft 31 will be in fully reciprocative position as shown, and the pawl 36 will engage the notch 34, retaining shaft 31 in that position. In other words, the entire assembly will be in the position illustrated in Figure 2, with the addition, however, that the carton 10 will not have engaged the lever 38 as illustrated therein, and the lever 38 and the pawl 36 will be in the dotted line position retaining the shaft 31 in the position shown therein. Thus the caster wheel 22 will be locked in the position shown.

However, as the carton 23 passes from the conveyor 10 to my assembly 18, it will engage the caster wheel 22 and be urged to the bottom of unit 18 as viewed in Figure 1. It will occupy generally the position 23a illustrated in Figure 1 and as shown in Figure 2. The carton 23a will first engage the arm 38 and release the pawl 36, from the notch 34. As the carton 23a advances, it will engage the member 41 which, it will be recalled, is held in the position illustrated, since the arm 44 of this member is retained in the position shown in Figure 2 by a notch 46. Therefore, as the carton 23a engages the member 41, it will serve to urge the entire assembly consisting of the shaft 31 and the levers 41 and 47 to the left, as illustrated in Figure 1. As the arm 47 moves to the left it will ultimately strike portion 51 of the frame 19, thereby causing it to pivot around the point 48, freeing the arm 44 from the notch 46, as shown in Figure 3. This having been accomplished, the member 41 will pivot about 43, and thus the carton 23a will be free to continue its travel to the left, as indicated in Figures 2 and 3. As the shaft 31 is moved to the left as viewed in Figures 2 and 3, it will cause the cross-shaft 26 likewise to pivot about the point 27, also causing the caster wheel 22 to move to the dotted line position shown in Figure 1.

The next carton advancing over the conveyor 10 will engage the caster 22 in its new position, and thus be urged in the other direction, that is, to the upper side of the member 18, as viewed in Figure 1.

However, as the cross-shaft 26 has been pivoted about the point 27, as previously described, the shaft 31a and its components have been moved to the right, as viewed in Figure 1, with the result that the pawl 36a will engage a notch in the shaft 31a and arm 38a will extend above the plane of the skate wheels 21. The arm 41a will occupy the position generally occupied by the arm 41 in Figure 2, and that portion of my device will be triggered to operate in the same manner as has previously been described in connection with shaft 31 and its components.

Thus it will be seen that as a carton strikes the caster wheel 22 when it is pivoted in one direction, it will be urged to one side of my device 18, while if a carton strikes the caster wheel when it is pivoted in the other direction, it will be urged to the other side of my device 18. In either event, the carton will serve to operate a mechanism which has already been cocked or set for operation by the action of the previous carton.

Thus it will be seen that I have provided a simple type of device for directing alternate cartons from one chute to another which depends solely upon the action of each carton as it advances over my device.

It should be pointed out that the member 41 is provided with an inturned portion 44a which is adapted to engage the lower side of the remote end of the shaft 31, thereby limiting the movement of the member 41 in a clockwise direction but in no way interfering with its motion in a counterclockwise direction.

I claim:

1. In a conveying device, a first conveyor carrying a plurality of objects in succession, a pair of conveyors associated with an end of said conveyor, and shunting means adjacent and registering with the first conveyor for receiving objects from the same and delivering said objects to said pair of conveyors, said shunting means being positioned between said first conveyor and said pair of conveyors and including means movable between two alternate positions in registry with said pair of conveyors, the movable means in one position delivering objects to one of said pair of conveyors and in the other position delivering objects to the other of said pair of conveyors, a pair of object engaging means associated with the pair of conveyors and projecting in the path of movement of the objects on each of the conveyors, means operatively connecting each of said object engaging means to the movable means whereby upon engagement of one of said pair of object engaging means by a moving object the movable means will be shifted from one alternate position to the other, an additional pair of object engaging means associated with the conveyors and projecting in the path of the objects on each of the conveyors, and means connected to each of said additional object engaging means preventing shifting movement of said movable means by said first named object engaging means until one of said additional object engaging means has been engaged by an object.

2. A conveying device as in claim 1 wherein said additional object engaging means is located in front of said first named object engaging means and is movable from an object engaging position to an out-of-the-way position.

3. In a conveying device, a first conveyor carrying a plurality of objects in succession, a pair of conveyors associated with a discharge end of said first conveyor, and shunting means registering with the first conveyor for receiving objects from the same and delivering said objects to said pair of conveyors, said shunting means being positioned between said first conveyor and said pair of conveyors and including pivotal means movable between two positions in registry with said pair of conveyors, the movable means in one position delivering objects to one of said pair of conveyors and in the other position delivering objects to the other of said pair of conveyors, at least two object engaging means projecting in the path of movement of the objects, means connecting said object engaging means to the movable means whereby upon engagement of one of said object engaging means by a moving object the movable means is shifted from one position towards the other position, and snap acting means connected to said movable means whereby upon movement of said movable means through dead center said movable means will be snapped to the other position.

4. In a conveying device, a first conveyor carrying a plurality of objects in succession, a pair of conveyors associated with a discharge end of said first conveyor, and shunting means registering with the first conveyor for receiving the objects from the same and delivering said objects to said pair of conveyors, said shunting means being positioned between said first conveyor and said pair of conveyors and including a caster movable between two positions in registry with said pair of conveyors, the caster in one position delivering objects to one of said pair of conveyors and in the other position delivering objects to the other of said pair of conveyors, object engaging means mounted on each of the pair of conveyors and projecting in the path of movement of objects on the associated conveyor, means operatively connecting said object engaging means to said caster whereby upon engagement of said object engaging means by a moving object the caster will be shifted from one position towards the other position, snap acting means connected to the caster for snapping said caster to the other position when said caster has been shifted through dead center by said object engaging means, additional object engaging means connected to each of the conveyors, said additional object engaging means projecting in the path of movement of the object on the associated conveyor in front of the first named object engaging means, and means operatively connected to said additional object engaging means and adapted to engage the means connecting said first named object engaging means to the caster to prevent shifting movement of said caster until actuation of said additional object engaging means.

5. In a conveying device, a conveyor carrying a plurality of objects in succession, a pair of conveyors associated with an end of said conveyor, and shunting means registering with the first named conveyor for receiving objects from the first named conveyor and delivering said objects to said pair of conveyors, said shunting means being positioned between said first conveyor and said pair of conveyors and including a caster mounted for rotation about an axis substantially in the plane of said conveyors, means for mounting said caster to permit pivotal movement of said axis of rotation between two positions, the caster in one position delivering objects to one of said pair of conveyors and in the other position delivering objects to the other of said pair of conveyors, first, second and third legs connected to said means for pivotally mounting the caster, the first and second legs extending in opposite directions and lying in a plane substantially parallel to the axis of rotation of the caster, the third leg being in substantially the same plane but extending at substantially right angles to the first and second legs, spring means connected to the third leg, object engaging means mounted in each of the pair of conveyors and movable between an out-of-the-way position and a position projecting in the path of movement of objects on the associated conveyor, a pair of arms pivotally connected to the object engaging means and the first and second legs extending in opposite directions, additional object engaging means mounted on each of the pair of conveyors and extending into the path of movement of the objects on the associated conveyor and in front of the first named object engaging means, said additional object engaging means being movable to an out-of-the-way position, latching means operated by said additional object engaging means for preventing movement of said arms in one direction until said latching means is released by actuation of said additional object engaging means.

References Cited in the file of this patent

UNITED STATES PATENTS

| | | |
|---|---|---|
| 1,516,409 | Scott | Nov. 18, 1924 |
| 2,136,267 | Taylor | Nov. 8, 1938 |
| 2,613,790 | Schattelkotte | Oct. 14, 1952 |